United States Patent [19]

Baumgarten et al.

[11] Patent Number: 5,111,570
[45] Date of Patent: May 12, 1992

[54] FORGE JOINING REPAIR TECHNIQUE

[75] Inventors: Robert W. Baumgarten, Palm Beach Gardens; John M. Robertson, Tequesta, both of Fla.

[73] Assignee: United Technologies Corporation, Hartford, Conn.

[21] Appl. No.: 566,005

[22] Filed: Aug. 10, 1990

[51] Int. Cl.⁵ .................................................. B23P 6/00
[52] U.S. Cl. .............................. 29/402.13; 29/402.09; 29/402.11; 29/402.16; 29/525.2; 228/119
[58] Field of Search .......... 29/402.01, 402.09, 402.11, 29/402.13, 402.16, 423, 525.2, 526.2, 526.3, 526.4; 228/119, 170, 193, 265

[56] References Cited

U.S. PATENT DOCUMENTS

| | | |
|---|---|---|
| 2,010,569 | 8/1935 | Sitzler ........................ 29/148 |
| 3,487,530 | 1/1970 | Ely ............................ 29/402 |
| 3,519,503 | 7/1970 | Moore et al. ............... 148/11.5 |
| 3,522,648 | 8/1970 | Weber ........................ 29/522 |
| 3,626,568 | 12/1971 | Silverstein et al. ........ 29/402.16 |
| 3,952,395 | 4/1976 | Crossman et al. ......... 29/401 C |
| 4,164,807 | 8/1979 | King ........................... 29/523 |
| 4,873,751 | 10/1989 | Walker et al. ............. 29/156.8 B |
| 4,953,777 | 9/1990 | Griffith et al. ............ 228/119 |

Primary Examiner—P. W. Echols
Assistant Examiner—David P. Bryant
Attorney, Agent, or Firm—Herbert W. Mylius

[57] ABSTRACT

A method is taught for repair of holes in superalloy or titanium materials by using plugs of the same or similar material and heat treatment, whereby a fully recrystallized joint interface is achieved between the plug and the walls of the hole.

19 Claims, 6 Drawing Sheets

FORGE JOINED REPAIRED BOLT HOLE
MICROSTRUCTURE — IN-100 ALLOY
RECRYSTALLIZED BOND INTERFACE

MAG 100X  KALLING'S ETCHANT

RECRYSTALLIZED
BOND
INTERFACE

*FIG. 8A*

FORGE JOINED REPAIRED BOLT HOLE
MICROSTRUCTURE — IN-100 ALLOY
RECRYSTALLIZED BOND INTERFACE

MAG 200X   KALLING'S ETCHANT

RECRYSTALLIZED
BOND
INTERFACE

*FIG. 8B*

FORGE JOINED REPAIRED BOLT HOLE
MICROSTRUCTURE — IN-100 ALLOY
RECRYSTALLIZED BOND INTERFACE

MAG 500X   KALLING'S ETCHANT

RECRYSTALLIZED
BOND
INTERFACE

*FIG. 8C*

FORGE JOINING REPAIR TECHNIQUE

TECHNICAL FIELD

This invention relates to the repair of titanium or superalloy gas turbine engine components having damaged, mislocated, misaligned, or misdrilled holes therein.

BACKGROUND ART

To date there has been no successful technique for repair of superalloy structures having holes therein which does not rely upon a static, mechanical bond joint. While the present invention was developed for specific application in the gas turbine engine field, and has particular application in this field, the invention is not limited thereto.

Gas turbine engines are widely used and well developed generators of power used primarily for propulsion of aircraft. The temperatures and stresses to which most gas turbine engine components are subjected require that such components be fabricated of high strength, high temperature materials, such as superalloys and titanium alloys. Further, the temperatures at which such components operate, and the stresses to which they are subjected, require that the materials be processed by hot working to achieve the necessary properties. Such hot worked materials have been very difficult to repair in the past without severe loss of high temperature capability. In addition, high volume fraction gamma prime nickel-base superalloys are not weldable, due to strain age cracking.

In large gas turbine engines the compressor and turbine sections are of axial flow design, and comprise a plurality of stages, each consisting of a disk or ring having a plurality of airfoils mounted on its rim. The blades and the disk or ring are mounted on rotating shafts and are subject to severe environmental conditions. Historically, blade and disk assemblies have been produced from separate components, and have been mechanically attached. While this permits manufacture of blades and disks from different materials, the use of mechanical attachment means adds substantially to the weight of the assembly.

Increases in performance requirements for gas turbine engines have now led to the development of integrally bladed rotors, wherein the blades are an integral part of the rotor, either formed integrally by such processes as isothermal forging under conditions of low strength and high ductility, or metallurgically bonded to the disk. Either form reduces the weight penalty resulting from prior art mechanical joining procedures.

With the increasing demand for higher performance and lighter weight assembly, many gas turbine components, such as the turbine section, are now produced as a one piece assembly. The primary advantages of such assemblies are in weight and fuel savings, and component life as a result of the elimination of life-limiting stress concentrators associated with mechanically attached components.

In assembly of a gas turbine engine, components are frequently joined by bolting one subassembly to another, using highly precise drilling to properly locate bolt holes in mating components. When such a hole is mislocated, misaligned, or misdrilled, or damaged during assembly or use, the subassembly in which it is located frequently must be scrapped. While this may be costly in the case of individual rotors, it is even more so in the case of integrally bladed rotors, where substantial expense has been incurred prior to joining one component to another. Thus, as the value of the individual assembly is increased, the margin of error in machining and joining components becomes more critical.

Past techniques for repair of such holes have frequently depended upon mechanical means, and have generally been limited to materials of lesser strength and temperature capability than the superalloys and titanium utilized in present day gas turbine engines. For example, U.S. Pat. No. 2,010,569, of Sitzler, teaches a method for plugging holes in plates using a special form or shape of a plug, having a cylindrical body portion and a centrally depending projection which increases in diameter from the upper end to the lower end. The plug is force fit into the hole, which has been countersunk so as to have projecting shoulders designed to lock the plug in place when pressed. The plug and metal plate are typically of the same metal, suitable for use in steam platens, and are not subjected to any heat treatment.

Crossman et al, in U.S. Pat. No. 3,952,395, teach a method for closing a drilled hole in a pneumatic or hydraulic system by press-fitting a ball into the hole to form a seal, and then "staking" the ball in position so as to crimp a portion of the work piece over the surface of the ball. In this case, the ball is of a harder material than the work piece, and is sized slightly larger than the diameter of the hole. No heat treatment is utilized.

Also, in U.S. Pat. No. 3,522,648, Weber teaches sealing a hole by deforming a ductile ball or slug of metal. Here, the spherical ball is deformed or upset so as to form a close contact and a mechanical metal-to-metal contact bond with the cylindrical walls of the hole. The ball is selected to be slightly more ductile than the casting so as to be readily deformed, and no heat treatment is used.

In U.S. Pat. No. 3,487,530, Ely teaches a method for repair of casting defects wherein one drills out the defect, fills the drilled area with a plug, diffusion bonds the casting and the plug, and removes excessive plug material. This method is specifically designed for cosmetic or surface repair of superalloy and refractory metal castings to avoid cracking problems associated with conventional fusion processes. In one embodiment of the process, the Patentee teaches boring or drilling the defect to reform the same into a truncated cone-shaped opening or hole, and driving a complementally tapered plug into the hole with a hammer to seal it therein. In all instances, a diffusion bond is induced without reaching the melting point or exceeding the yield point of the cast member or the plug. The process may also be practiced in the form of friction welding.

SUMMARY OF THE INVENTION

In the compressor and turbine sections of gas turbine engines, the disk and drum sections are operated near or at the outer limits of their property capabilities with respect to both temperature and stress. Accordingly, any repair technique to such components must provide repairs which have the strength and temperature capabilities of the parent metal. Other requirements of the components, such as fatigue resistance, resistance to rupture, and life span must also be met.

The need for repair can arise both in service and in the initial fabrication of either individual disk, rotor, and drum assemblies or integrated units. With one piece fabrication requiring that mounting holes be positioned in precise locations, the criticality of a hole being correctly positioned is substantially increased. Further, bolt holes and mounting holes may become elongated in service. Consequently, it is an object of the present invention to provide a method for bolt hole repair.

The present invention relates to a method for filling a hole in a nickel-based superalloy or titanium material by inserting a plug of essentially the same or similar material and heat treatment history as the metal to be repaired, and locally heating the plug and hole area under constraints so that the plug is bonded circumferentially around the plug/hole interface by application of axial bond pressures in the range of 5-50 ksi.

According to one aspect of this invention, a damaged or deviated hole in a turbine engine assembly is enlarged by drilling, leaving an oversized hole. A repair plug of the same or similar material and heat treatment as the parent metal is positioned in the oversized hole and protruding from both ends thereof, and subjected to forge joining pressures and temperatures so as to result in a fully recrystallized joint interface between the plug and the walls of the hole. As a result, mechanical properties of the assembly, and tensile and bolt hole low cycle fatigue factors are near original levels.

Thus, it is an object of this invention to provide a method for repair of holes in metal in such a manner as to achieve a metallurgical bond between the replacement plug and the hole interface. It is a further object of the invention to provide a means for repair of superalloy assemblies having damaged, mislocated, misaligned, or misdrilled holes therein in such a manner that said repair does not weaken or lessen the strength or temperature capability of said assembly. It is a specific object of the invention to provide for the repair of a misdrilled or misaligned hole in titanium or in a superalloy in such a manner that a new properly positioned and aligned hole may be drilled through the repair location while retaining the necessary mechanical properties of the work piece. Although this invention is described in terms of repairing holes passing entirely through a work piece, the technique is also applicable to repair of surface defects and damage.

These and other objects and advantages will become more readily understood through reference to the following description of the drawings and preferred embodiments.

DETAILED DESCRIPTION OF THE INVENTION

The present invention provides a method for repair of damaged or improper holes in high strength, high temperature materials such as nickel-base superalloys and titanium, and may also be used to fill holes such as bolt holes, cooling holes or assembly guide passages in such materials. The invention is specifically directed to repair of holes in titanium-base alloys and both nonhardenable and precipitation-hardenable nickel-based superalloys. Representative of the alloys are those nickel-base alloys designated in the industry as Mar M 200, IN 100, Inconel 718, Waspaloy, Astroloy, Udimet 500, Rene 41, Inconel X, Inconel 625, and MERL 76. Titanium alloys may be alpha, alpha-beta, or beta titanium alloys. Frequently utilized titanium alloys include alloys Ti-6Al-4Mo, Ti-8Al-1Mo-1V, Ti-6Al-2Sn-4Zr-2Mo, and other alloys of like nature and composition.

Figure 1:
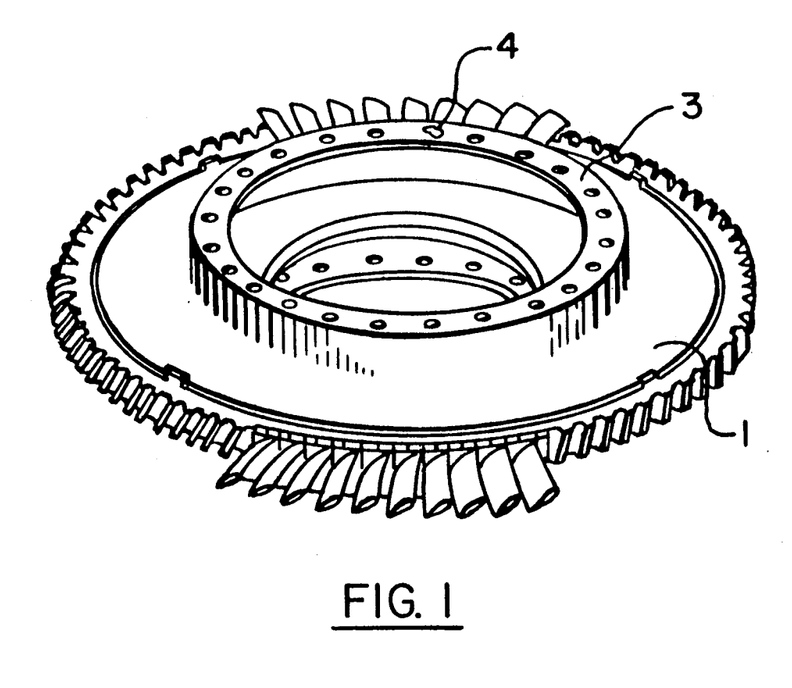
FIG. 1 illustrates an integrally bladed compressor disk with a damaged hole in the flange.

Such materials are frequently used for the preparation of gas turbine engine components, as illustrated in FIG. 1, such as an integrally bladed compressor disk, 1, having bolt holes 2 located on the flange 3 for joining to additional engine components. Irregular bolt hole 4 represents a damaged hole, but could as well represent a mislocated or misaligned hole, just as the exemplary compressor disk could be any component intended to be joined to another component by such means as bolting. Similarly, the present invention is applicable to repair of holes in other structures, such as turbines, boilers, heat exchangers, plates, nozzles, pressure vessels, etc., of various metals or alloys, such as copper alloys, iron alloys, cobalt-based superalloys, magnesium alloys, aluminum alloys, columbium alloys, etc.

Figure 2:
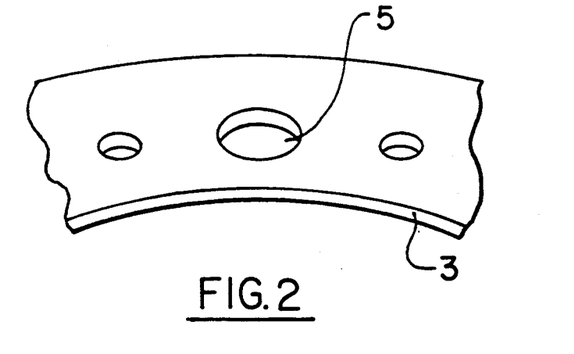
FIG. 2 shows an enlarged view of the damaged hole drilled out to a larger diameter.

Preparation for repair includes enlarging the damaged area to a cylindrical shape of larger diameter, as illustrated in FIG. 2, which is a fragmentary view of FIG. 1, showing flange 3, with the enlarged hole indicated by 5. The hole is enlarged to the diameter of the intended repair bond joint, encompassing the entire area to be repaired, within the surface area of flange 3. Removal of the damaged portion may be done by any conventional hole drilling technique, and the intended bond surface, i.e. the wall of the enlarged hole, should then be treated to encourage bonding. This generally encompasses removal of all foreign materials, including dirt, grease, drilling residue, etc., and surface oxidation. Such surface preparation may be accomplished by a variety of readily apparent techniques, such as mechanical surface grinding, bore finishing, and selective chemical etching.

Figure 3:
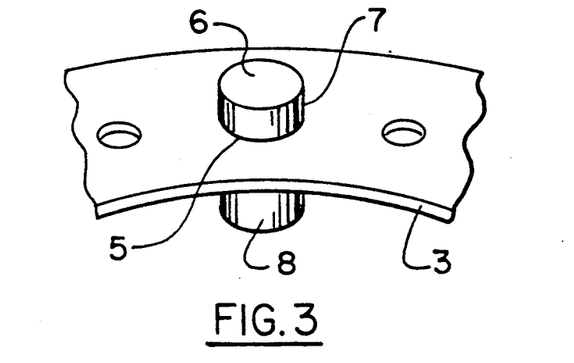
FIG. 3 shows a replacement plug in position in the oversized hole.

The plug, 6, as shown in position in FIG. 3, is preferably of the same material as the material surrounding enlarged hole 5 in flange 3, and is preferably of the same heat treatment, so as to achieve the maximum similarity of properties to the surrounding material. However, suitable replacement plugs may also be of a different heat treatment and/or composition, dependent on the application and mechanical property requirements of the specific utility of the material. Thus, the plug may differ from the substrate either in composition or heat treatment, so long as such difference does not prevent the formation of a bond between the plug and substrate of adequate strength and other properties to allow the repaired substrate to be used for its designed purpose and function.

The plug is sized to fit closely within the diameter of enlarged hole 5, but is preferably undersized by from about 0.0005 to 0.004 inches in diameter, and most preferably undersized by about 0.001 to 0.002 inches in diameter. It has been found that a close tolerance fit is critical to obtain the strongest interfacial bonding between the plug and the walls of the enlarged hole. The plug should be treated to encourage bonding in the same manner as the wall of the enlarged hole. The plug 6 should extend beyond the surfaces of the flange 5 by at least approximately 0.025 inch, preferably about 0.080 inch, but by at least sufficiently to provide an upset upon forge bonding of from about 0.020 to 0.100 inches. It has been found that the best results are achieved when the height of the plug, and thus the amount of plug extending beyond the enlarged hole, 7 and 8, is sufficient to assure the presence of sufficient material to achieve metal flow upon deformation and completely fill the void area between plug 6 and enlarged hole 5. Although it is possible to use a shorter plug, the resultant repair may be weaker, or in extreme cases not large enough to completely fill the length of enlarged hole 5, resulting in depressions in flange 3.

Figure 4:
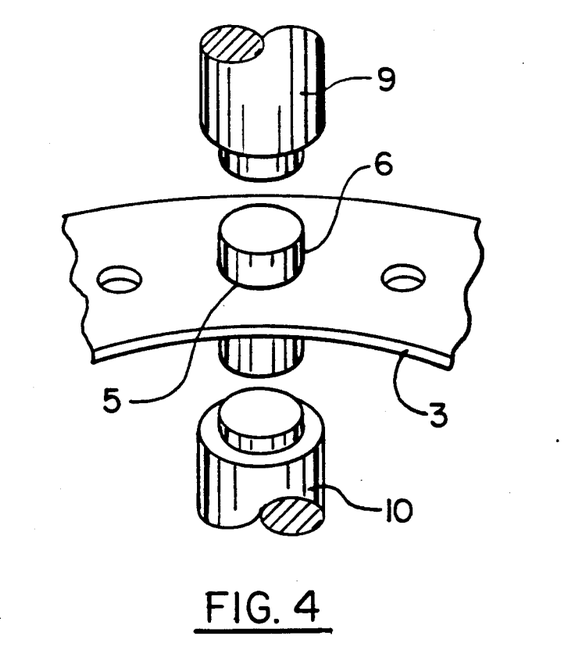
FIG. 4 shows an exploded schematic view of means for forging the replacement plug in accordance with the present invention.

After the repair plug 6 is positioned in the enlarged hole 5, a forge joining pressure is applied from both ends of the plug, creating a radial force exerted by the plug circumferentially on the wall of the hole. The application of force is illustrated schematically in FIG. 4 by upper and lower punches 9 and 10, which are shaped and positioned to promote uniform heating and deformation of plug 6. While not illustrated, it is contemplated that compression means, such as dies or clamps, etc., may be applied to the lateral edges of the flange adjacent to the repair site so as to prevent deformation of the flange during the forge joining of the plug and the flange. Such means would be of particular value in repair of holes in relatively thin flanges or metal alloy sheet materials, or where the repair is necessarily in close proximity to the edge of the work piece. Such means are to be considered to be within the scope of the present invention.

While force is applied to the plug, the interface between the plug and the wall of the enlarged hole is locally heated to a temperature generally within about 200° F. of, but not exceeding, the solution heat temperature of the alloy, without causing local melting thereof, thereby minimizing grain growth. At forge joining temperatures and pressures, the plug and the area immediately adjacent the wall of the enlarged hole exhibit low strength and high ductility, permitting the plug to deform and join to the wall. Local heating may be accomplished by any appropriate means, including resistance, induction, radiant, and electron beam heating. The preferred heating means is by electric resistance, utilizing the tooling interface contact with the flat ends of the plug to obtain uniform electrical contact, although other heating techniques may be utilized. Such means as require frictional heating by methods such as inertia or friction welding, utilizing a tapered plug, are less efficient and outside the scope of the present invention.

Figure 5:
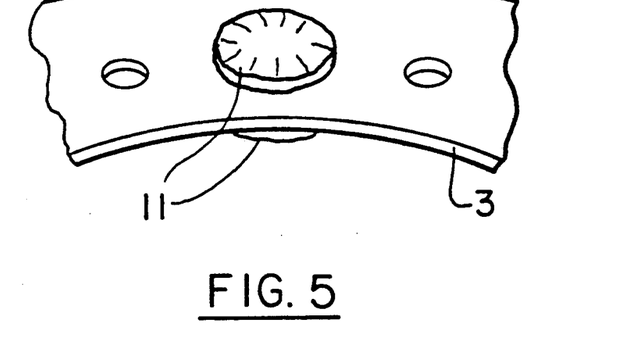
FIG. 5 illustrates a plug after forge joining deformation.
Figure 6:
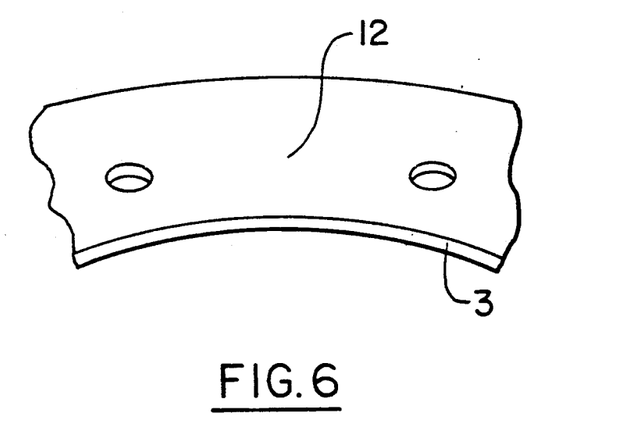
FIG. 6 illustrates the drum flange of FIG. 1 with the repair completed and excess deformation of the replacement plug machined away.
Figure 7:
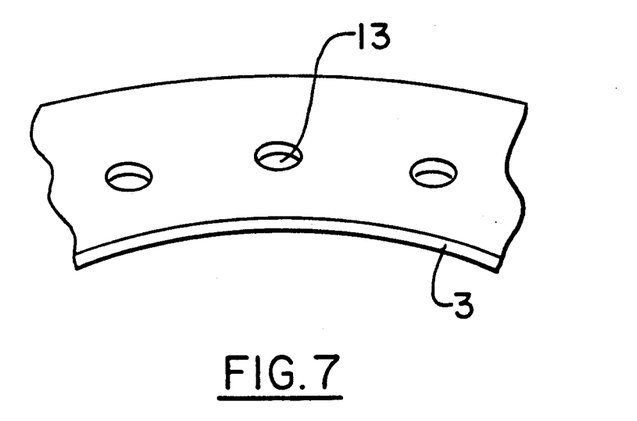
FIG. 7 illustrates the flange of FIG. 1 with a new hole drilled in the correct position.

Deformation of the plug in the enlarged hole is normally conducted under high vacuum, e.g. $10^{-5}$ millimeters Mercury pressure, although the invention may also be practiced in an inert atmosphere, such as argon. The temperature and applied pressure are adjusted and controlled so as to provide deformation of the plug under conditions of low strength and high ductility, and movement of the superplastic material so as to produce a metallurgical bond between the plug and the hole interface. These conditions will obviously vary, depending exactly upon the materials involved. However, for typical nickel-base superalloys the temperatures will be on the order of 1700° to 2100° F., preferably from 1900° to 2100° F., and more preferably from 1960° to 2040° F., and the pressures will be on the order of 5 to 50 ksi, preferably from 15 to 30 ksi. Titanium-base alloy repair temperatures may be from about 1500° to 1900° F., with pressures preferably between 4 and 10 ksi. Appropriate temperatures and pressures for other metals and metal alloys will be readily determined by one of ordinary skill in the art. At the conclusion of the forge joining step, excess protrusion material, 11, is located on both sides of the flange, 3, as illustrated in FIG. 5. Such material may then be machined away, leaving a smooth surfaced flange with a completed repair 12, as illustrated in FIG. 6. This surface may then be redrilled, to provide a new hole 13 of selected position and diameter, as shown in FIG. 7.

An important feature of this invention is the ability to achieve recrystallization of the metal at the joint interface. That is, the joint area is hot worked sufficiently during the bonding process to nucleate and grow fine, strain-free recrystallized grains at and across the bond interface. The result is grain boundary movement and/or growth across the bond interface, which results in modification of the original bond line by absorption/elimination of high vacancy defect concentration areas (i.e. bond-line voids) during recrystallization. Such a result may only occur when sufficient work is applied to the interfacial area during bonding to recrystallize the bond interface. The criticality of the relationship of the dimensions of the plug and the enlarged hole is to offer sufficient constraint, i.e. resistance to metal flow, to work the material sufficiently to exceed that critical amount of work required to achieve recrystallization. The typical diffusion bonding operation does not provide sufficient working to recrystallize the interface, due to a lack of constraint. The present invention results in a recrystallized interface, which achieves grain boundary migration across the interface, and absorption of associated bond-line vacancy defects.

Figure 8A:
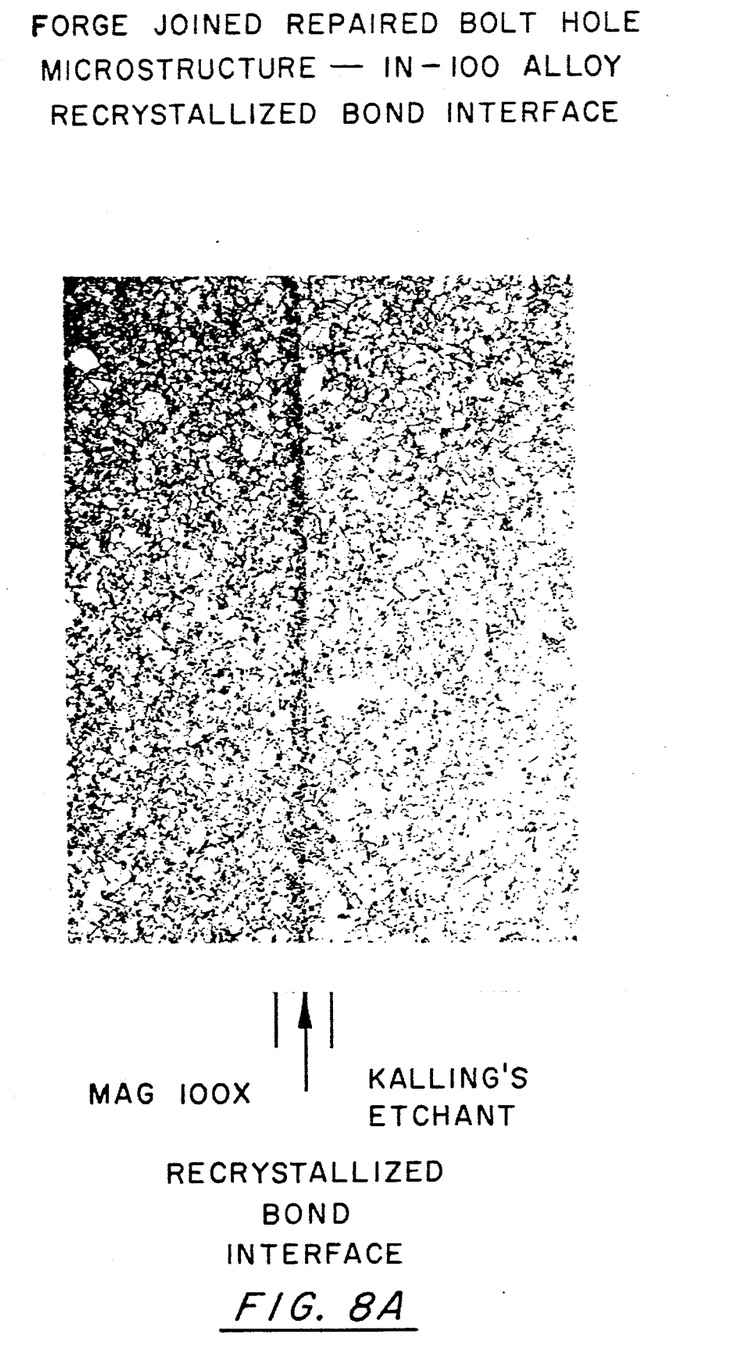
FIGS. 8A, B, and C are photomicrographs illustrating microstructures relating to the product of the inventive process.
Figure 8B:
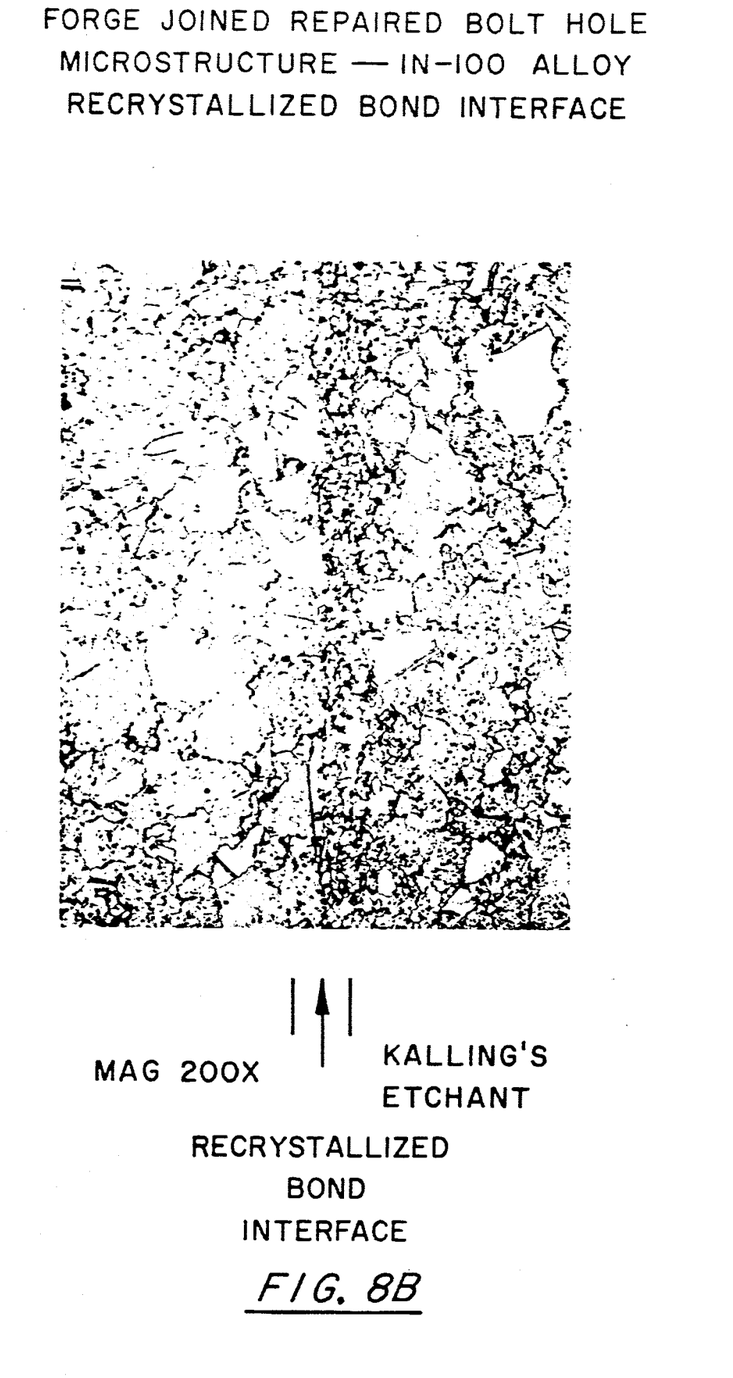
Figure 8C:
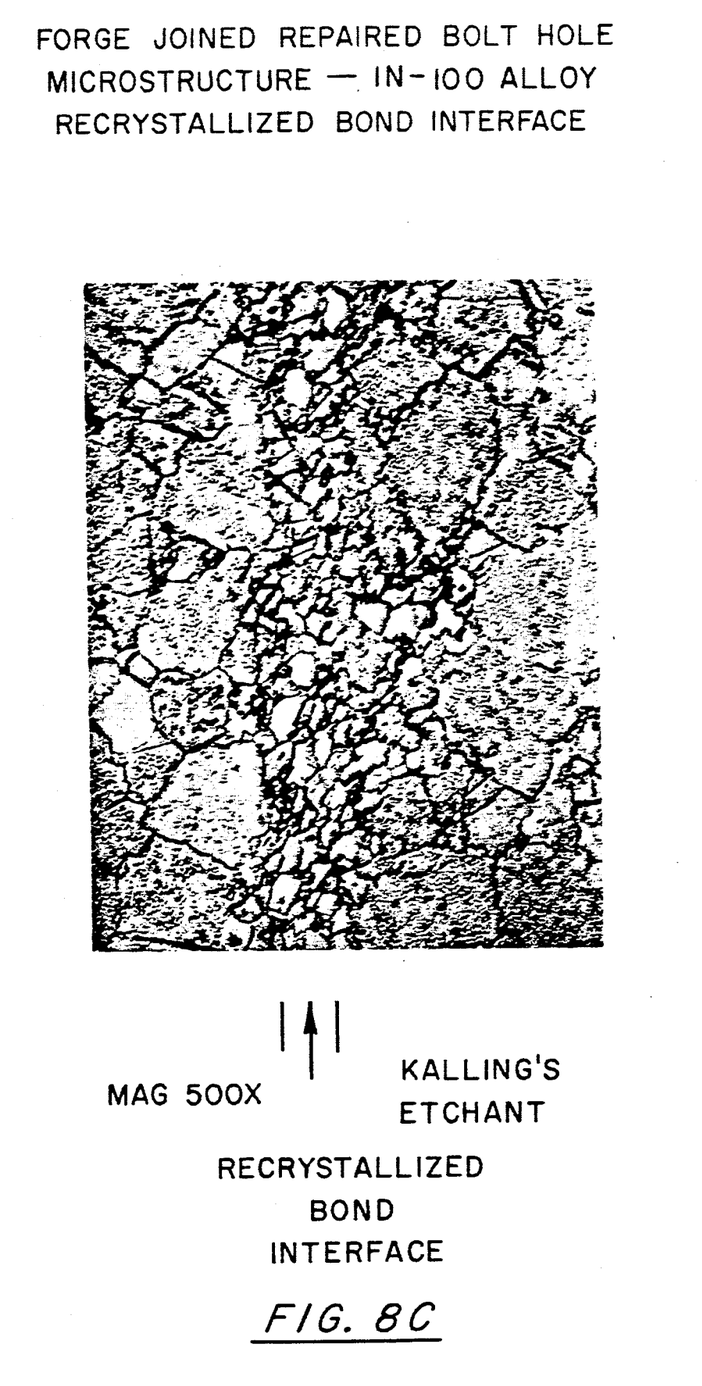

FIGS. 8A, 8B, and 8C are photomicrographs showing the recrystallized zone at the bond-line interface for a repaired IN 100 alloy, at magnifications of 100X, 200X, and 500X respectively, as etched by Kalling's Etchant. The recrystallized grain diameter size is 2.5 to 5 microinches (ASTM 12-14), while the surrounding base-line material is 22 to 90 microinches (ASTM 4 to 8) grain diameter. Such decreased grain size in this region may be expected to yield an increase in strength in some materials. Mechanical properties, such as tensile strength and low cycle fatigue resistance, in the repaired area generally meet or exceed the minimum capability requirements of the original alloys, although actual as-worked capabilities of the original alloys have also been demonstrated and exceeded. It should also be noted that the repaired piece may be subjected to selective heat treatment after joining if such is deemed necessary or appropriate.

EXAMPLE 1

A screening study was conducted on bolt hole configurations ranging from 0.25 to 0.50 inch diameter through flanges ranging in thickness from 0.20 to 0.46 inches, to assess the significance of key variables, using IN 100 nickel-base superalloy. Sixteen microstructural observations were made and ranked to evaluate the following variables: bolt hole diameter, material thickness, bond temperature, hole and plug fit tolerances, forging load, upset, and cooling rate. Test results indicated that the combination of close plug fit tolerance (e.g. about 0.001 inch), high upset (e.g. about 0.070 inch), and high pressure (e.g. 35-50 ksi), facilitate the recrystallization phenomenon in the temperature range from about 1960° to 2040° F.

TABLE I

FACTORIAL EXPERIMENT MATRIX AND RANKING

| Run # | Tolerance (in.) | Bar Thickness (in.) | Plug Diameter (in.) | Temp (°F. ± 10° F.) | Pressure Based on End Area of Plug (psig) | Upset (in.) | Cool-down Rate (°F./min) | Ranking* |
|---|---|---|---|---|---|---|---|---|
| 1 | ±.001 | 0.46 | 0.25 | 1960 | 199 ± 10 | 0.039 | 50 | 2 |
| 2 | ±.001 | 0.20 | 0.25 | 1960 | 349 ± 10 | 0.083 | 100 | 3 |
| 3 | ±.005 | 0.20 | 0.25 | 2040 | 199 ± 10 | 0.043 | 100 | 3 |
| 4 | ±.005 | 0.20 | 0.50 | 2040 | 1197 ± 15 | 0.079 | 100 | 2 |
| 5 | ±.005 | 0.20 | 0.25 | 2040 | 349 ± 10 | 0.083 | 50 | 3 |
| 6 | ±.001 | 0.20 | 0.50 | 1960 | 1995 ± 20 | 0.070 | 100 | 3 |
| 7 | ±.005 | 0.20 | 0.50 | 2040 | 1995 ± 20 | 0.072 | 50 | 3 |
| 8 | ±.005 | 0.46 | 0.50 | 1960 | 1197 ± 15 | 0.079 | 100 | 2 |
| 9 | ±.001 | 0.46 | 0.50 | 2040 | 1197 ± 15 | 0.077 | 50 | 4 |
| 10 | ±.005 | 0.46 | 0.50 | 1960 | 1995 ± 20 | 0.035 | 50 | 1 |
| 11 | ±.005 | 0.20 | 0.50 | 2040 | 1197 ± 15 | 0.042 | 100 | 4 |
| 12 | ±.001 | 0.46 | 0.25 | 2040 | 199 ± 10 | 0.078 | 50 | 2 |
| 13 | ±.001 | 0.46 | 0.25 | 2040 | 349 ± 10 | 0.034 | 100 | 4 |
| 14 | ±.005 | 0.46 | 0.25 | 1960 | 349 ± 10 | 0.046 | 50 | 4 |
| 15 | ±.001 | 0.20 | 0.50 | 1960 | 1197 ± 15 | 0.038 | 50 | 4 |
| 16 | ±.001 | 0.46 | 0.50 | 2040 | 1995 ± 20 | 0.029 | 100 | 4 |

*Microstructure of bond interface ranked 1 (best quality) - 4

EXAMPLE 2

Two repairs of holes drilled in IN 100 alloy bars were conducted in accordance with the present invention. Designated HR-6 and HR-17, these repairs were conducted with the parameters set forth in Table II.

TABLE II

TYPICAL BOLT HOLE REPAIR FORGE-JOINED BOND PARAMETERS - IN-100

| Test Specimen | Bond Temp ±10° F. | Bond Pressure ksi | Upset Travel In | Heat Treatment ±10° F. | Plug Dia +0.004 In −0.000 | Plug Lgth +0.003 In −0.000 | Hole Dia +0.000 In −0.004 | Flange Thickness ±0.003 |
|---|---|---|---|---|---|---|---|---|
| #HR-6 | 2060 | 20 | 0.075 | 1800/1 HR/AC 1350/8 HR/AC | 0.437 | 0.530 | 0.4375 | 0.460 |
| #HR-17 | 2000 | 20 | 0.065 | 1800/1 HR/AC 1350/8 HR/AC | 0.437 | 0.530 | 0.4378 | 0.460 |

EXAMPLE 3

Alloy bars repaired as in Example 2 were subjected to tensile tests to compare the properties of the repaired material to the minimum specifications of IN 100 alloy. These results are set forth in Table III.

TABLE III

TYPICAL BOLT HOLE REPAIR FORGE-JOINED MECHANICAL PROPERTIES - IN-100

| Material Specification | Test Temp °F. | UTS ksi | YS ksi | % EL | % RA | Failure Location |
|---|---|---|---|---|---|---|
| IN-100 (Spec. minimum) | 1000 | 190.0 | 128.0 | 18.0 | 20.0 | |
| #HR-6 | 1000 | 200.6 | 146.3 | 18.7 | 26.5 | Outside Bond Zone |
| #HR-17 | 1000 | 196.0 | 138.9 | 20.2 | 24.0 | Outside Bond Zone |

EXAMPLE 4

Additional bolt hole repairs were conducted in IN 100 alloy bar stock in accordance with the present invention, and subjected to uniaxial low-cycle fatigue testing, generally in accordance with the procedure of ASTM E606-80, "Standard Recommended Pactice for Constant-Amptitude Low-Cycle Fatigue Testing". Testing was conducted at 800° F., 240 ksi maximum concentrated stress (maximum nominal stress of 94 ksi for a $K_T$ of 2.55), a stress ratio $R_e$ of 0.05, and a cyclic frequency of 10 cpm. Bolt hole test specimens were fabricated using standard manufacturing procedures, and center holes were processed using a drill-bore hone and Sutton-Barrel approach. The results of these fatigue tests are shown in Table IV.

It is to be noted with respect to low-cycle fatigue testing, that under conditions of the test as conducted, IN 100 alloy bar stock could be anticipated to yield a 99.9 percent lower bound of 12,599 cycles before failure, while each of the repaired specimens far exceeded this number.

TABLE IV

BOLT HOLE LOW-CYCLE FATIGUE TESTS - IN-100 CENTER HOLE NOTCH SPECIMEN

| Test Specimen | Test Temp °F. | Max Stress (Conc.) ksi | Cycles To Failure | Remarks |
|---|---|---|---|---|
| #1 | 800° F. | 240 ksi | 23,498 | — |
| #2 | 800° F. | 240 ksi | 17,547 | — |
| #3 | 800° F. | 240 ksi | 30,837 | — |
| #4 | 800° F. | 240 ksi | 25,250 | Suspended Test No Failure |

It is to be understood that the above description of the present invention is susceptible to considerable modification, change, and adaptation by those skilled in the art, and that such modifications, changes and adaptations are to be considered to be within the scope of the present invention, which is set forth by the appended claims.

We claim:

1. A method for the repair of a damaged area in a metal alloy substrate including the steps of:
   a) enlarging the damaged area to a cylindrical hole passing through said substrate, said hole having a predetermined uniform diameter;
   b) preparing the walls of said hole to remove contamination;
   c) positioning in said hole a cylindrical plug comprising a material similar to said metal alloy and having a similar heat treatment, said plug having been prepared by removal of contamination, and being of a uniform diameter from 0.0005 to 0.004 inches less than the predetermined uniform diameter of said hole, and extending beyond the ends of said hole; and
   d) applying a force to the ends of said plug, while locally heating said plug and the walls of said hole to a temperature which causes deformation and softening of said plug, metal flow, and formation of a bond-line interface between said plug and said walls.

2. A method as set forth in claim 1 wherein said plug is subjected to a temperature within 200° F. of, but not exceeding the solution temperature of the alloy.

3. A method as set forth in claim 2, wherein said temperature is sufficient to cause recrystallization to occur at and across the interface between said plug and the walls of said hole.

4. A method as set forth in claim 3, wherein the bond-line interface between the plug and the walls of said hole is within a recrystallized zone.

5. A method as set forth in claim 4, wherein the recrystallized grain diameter size is less than the grain diameter of the material surrounding the recrystallized zone.

6. A method as set forth in claim 5, wherein said recrystallized grain diameter is from 2.5 to 5 microinches.

7. A method as set forth in claim 4, further including the step of removing excess plug material from the surface of said metal alloy substrate.

8. A method as set forth in claim 4, wherein said alloy is a titanium alloy.

9. A method as set forth in claim 4 wherein said alloy is a nickel-based superalloy.

10. A method for the repair of a damaged area in a structure composed of a material selected from titanium alloys and nickel-based superalloys, said method including the steps of:
    a) enlarging the damaged area by drilling a hole of a predetermined uniform diameter encompassing said area;
    b) treating the walls of said hole to encourage bonding;
    c) preparing a plug of a second material having the same or similar composition and heat treatment as said material, having a diameter of from 0.0005 to about 0.004 inches less than the diameter of said hole and a length sufficient to extend beyond the ends of said hole;
    d) positioning said plug in said hole;
    e) applying sufficient pressure to said plug, and locally heating said plug and the surrounding walls of said hole to forge join said plug to said walls; and
    f) removing excess plug material from the surface of said structure.

11. A method as set forth in claim 10 wherein said structure is a mating surface of a component of a gas turbine engine.

12. A method as set forth in claim 10 wherein said pressure and temperature are sufficient to cause metal flow and forge joining of the plug and said structure.

13. A method as set forth in claim 12 wherein recrystallization occurs at the interface of said plug and said structure.

14. A method as set forth in claim 13, wherein the grain diameter in the recrystallized zone is less than the grain diameter in the surrounding structure.

15. A method as set forth in claim 12 further including the step of redrilling a hole through the area of the repair.

16. A method as set forth in claim 12 wherein said material is a nickel-based superalloy.

17. A method as set forth in claim 16 wherein said material is selected from the group consisting of Mar M alloys, MERL 76, IN 100, Inconel alloys, Waspaloy, Astroloy, and Udimet alloys.

18. A method as set forth in claim 12 wherein said material is a titanium alloy.

19. A method as set forth in claim 18 wherein said material is selected from the group consisting of Ti-6Al-4Mo, Ti-8Al-1Mo-1V, and Ti-6Al-2Sn-4Zr-2Mo.

* * * * *

UNITED STATES PATENT AND TRADEMARK OFFICE
CERTIFICATE OF CORRECTION

PATENT NO. : 5,111,570

DATED : May 12, 1992

INVENTOR(S) : Robert W. Baumgarten et al

It is certified that error appears in the above-identified patent and that said Letters Patent is hereby corrected as shown below:

In column 8, line 33, change "$R_e$" to --$R_\theta$--.

Signed and Sealed this

Twelfth Day of October, 1993

Attest:

BRUCE LEHMAN

Attesting Officer

Commissioner of Patents and Trademarks